3,542,535
MULTI-FOCAL LENS WITH INDEX GRADIENT
Joseph R. Hensler, Rochester, and Charles H. Rosenbauer, Irondequoit, N.Y., assignors to Bausch & Lomb Incorporated, Rochester, N.Y., a corporation of New York
Filed Nov. 15, 1967, Ser. No. 683,282
Int. Cl. C03b *11/08, 15/00*
U.S. Cl. 65—30                                    4 Claims

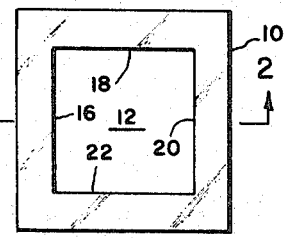
FIG. 1
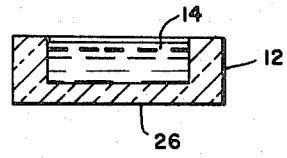
FIG. 2
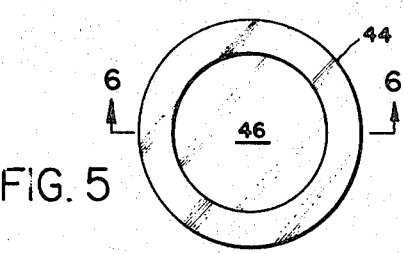
FIG. 5
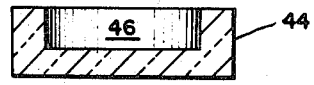
FIG. 6
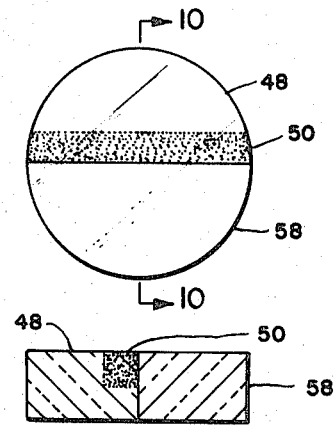
FIG. 9
FIG. 10
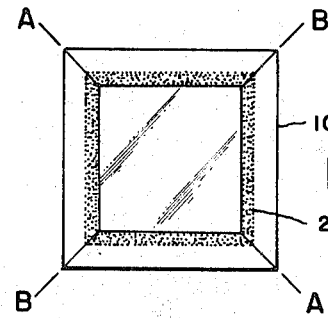
FIG. 3
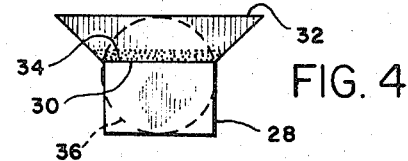
FIG. 4
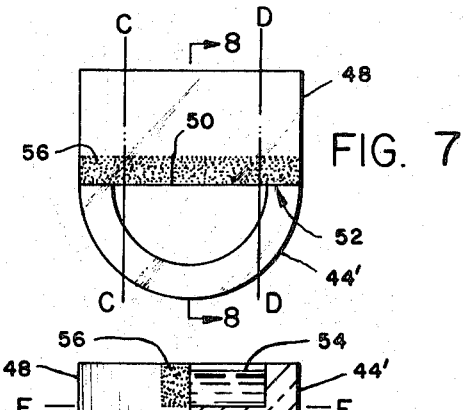
FIG. 7
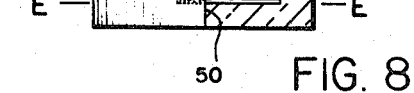
FIG. 8
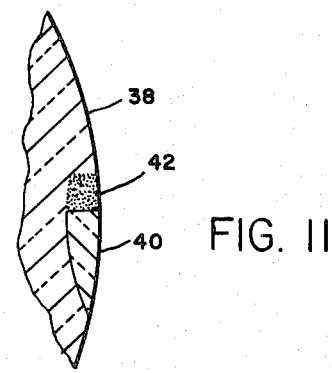
FIG. 11
JOSEPH R. HENSLER
CHARLES H. ROSENBAUER
*INVENTORS*
BY Frank C. Parker
ATTORNEY United States Patent Office 3,542,535
Patented Nov. 24, 1970

ABSTRACT OF THE DISCLOSURE

An improved method for making a fused multi-focal lens of the type wherein there is provided a gradual change in the index of refraction from that of the major lens member to that of the minor lens member. The shape of the beginning of the diffused zone is essentially a straight line.

BACKGROUND OF THE INVENTION

This invention relates to multi-focal lenses, and, more particularly, to a novel method of making a multi-focal lens having an intermediate region between the major element and the minor segment in which the refractive index varies according to a gradient function, being approximately equal to the index of the segment along one edge, and approximately equal to the index of the major element along its other edge.

In the manufacture of ophthalmic lenses it has been found desirable to provide multi-focal lenses for correction of distance and near vision. In order to accomplish this it is necessary to provide a lens composed of at least two pieces of glass of different refractive index. At the present time substantially all multi-focal lenses have a fused interface between these two vision portions which appears as a distinct line at such interface. This line, because it is formed by fusing two pieces of glass, results in a plane surface for reflecting light which is distracting to the wearer of such lenses. Attempts to reduce this interface reflection have included coloring the surface along the plane of fusion, but this has not been entirely successful.

SUMMARY OF THE INVENTION

To avoid the above described problems, and, to in general, provide an improved multi-focal ophthalmic lens, we have devised a method of making a multi-focal lens having a zone between the major and minor lens portions in which the refractive index varies according to a gradient. The contemplated zone of varying index of refraction has one end an index of refraction identical to that of the major lens member and the other end an index of refraction identical to that of minor lens member. When these conditions are met the distracting plane of reflection is eliminated. The refractive index gradient is produced by diffusing a metal ion into a suitably prepared piece of glass prior to fusion.

Accordingly, it is a primary object of this invention to provide a multi-focal ophthalmic lens having a gradient transition region between the portions of different index of refraction.

It is a further object of this invention to provide a method for changing the refractive index of a lens material such as glass by migration of metal ions into the surface of the glass.

It is another object of this invention to provide by diffusion a gradual graduated change in refractive index of a lens segment.

BRIEF DESCRIPTION OF THE DRAWINGS

FIG. 1 is a plan view of a blank illustrating the first step of a first embodiment of the inventive concept.

FIG. 2 is a view taken along lines 2—2 of FIG. 1 with the diffusant added.

FIG. 3 is a plan view similar to FIG. 1 after diffusion.

FIG. 4 illustrates the preparation of the segment.

FIG. 5 is a plan view of a second embodiment of the invention.

FIG. 6 is a view taken along lines 6—6 of FIG. 5.

FIG. 7 is a plan view of the diffusion step.

FIG. 8 is a view taken along line 8—8 of FIG. 7.

FIG. 9 is a plan view of the prepared segment.

FIG. 10 is a section taken along lines 10—10 of FIG. 9.

FIG. 11 is a fragmentary cross-sectional view of a finished lens according to the present invention.

DESCRIPTION OF THE PREFERRED EMBODIMENTS

Referring now to FIG. 1, there is shown a generally square glass blank 10 into which a well 12 has been pressed. The well 12 is generally square shaped with generally vertical walls. As shown in FIG. 2 the well is filled with a suitable diffusant such as AgCl 14. The blank 10 is pressed from glass identical in refractive index to the glass of which the major lens portion is to be made. The filled blank 10 is then subjected to a suitable thermal cycle for diffusing the silver ions into the walls 16, 18, 20, 22 of the well 12. The diffused zone is shown as 24 in FIG. 3. After the diffusion cycle is complete the diffused blank 10 is parted along the lines A—A and B—B as shown in FIG. 3. The bottom portion 26 (FIG. 2) of the blank 10 is then removed as by sawing and grinding. Referring now to FIG. 4 a blank 28 of high index glass such as used for the near vision portion is prepared with at least one edge 30 fine ground and polished for fusion. To this edge 30 there is fused a section 32 taken from the blank 10 along the surface 34 which is a former wall of well 12. The surface 34 is also suitably prepared for fusion. After fusion a blank such as shown by the dotted circle 36 is prepared from the fused assembly. This blank 36 may then be prepared for fusion to a major lens member by techniques well-known in the art of multi-focal ophthalmic lens manufacture. After fusion to the major lens member the entire lens is ground and polished, yielding a multi-focal lens as shown in FIG. 11, comprising a major lens portion 38 a minor lens portion 40 and a diffused zone 42 therebetween.

Referring now to FIG. 5 there is shown a second embodiment of the instant invention. A glass blank 44 as shown in FIG. 5 is prepared with a circular well 46. The well is parted along one diameter and adhered to a suitably prepared piece of glass 48 having an index of refraction identical to that of the major lens member 38. One edge 50 (FIG. 7) of the blank 48 is fine ground and polished as is edge 52 of the one-half segment 44'. At this point in the process, the blank 48 is of uniform refractive index, and the zone 56 of graduated index has not yet been produced. The blank 48 is fused to one-half 44' of the circular blank 44, along the diameter, to form a semi-cylindrical well. The semi-cylindrical well is filled with a diffusant 54 as shown in FIG. 8. After exposure to a proper thermal cycle a diffused zone 56 appears in the blank 48 adjacent to the wall. The semi-circular well portion 44' is then removed from segment 48 as by parting along lines C—C and D—D of FIG. 7 and line E—E of FIG. 8. As shown in FIG. 9 a piece of high index glass 58 of the index of refraction necessary for the near vision portion of the finished lens is fused to the segment 48 along surface 50. From this a suitable blank as shown in FIG. 9 and in cross-section in FIG. 10 is prepared. As before this segment can then be fused to a suitably prepared major lens member as is well-known in the art yielding a multi-focal ophthalmic lens with a diffused segment as shown in FIG. 11.

Embodiments described herein are directed to the use of metal ions as a diffusable material for changing the refractive index of glass. Other optical materials, such as plastics may be treated by similar processes using a suitable diffusant for altering the refractive index. It is also possible to lower the refractive index of the higher index material by choice of a suitable diffusant.

Silicate glass is the preferred lens medium for the starting blanks 10 and 44 and the major lens member 38. A silicate crown glass (refractive index equals 1.50) was altered using silver ions as the diffusant. By using silver the refractive index for this silicate glass was increased to 1.525 on the surface in contact with the molten silver, and to a gradually lesser degree to a depth of 5 mm. The edge of highest index of refraction was fused to a piece of segment glass of an index of refraction of 1.525. From this fused piece a segment button such as shown in FIG. 9 was prepared. This button was then fused to a suitably prepared major lens member of refractive index of 1.50 and a lens as shown in FIG. 11 produced.

It has been found that penetration distance for various silicate glasses can be as high as seven millimeters using thermal diffusion from a molten silver chloride bath, at temperatures of 500 to 600° C. for periods of time from 1 to 72 hours.

Metal compounds using silver, copper, thallium, or other cations and chloride, bromide, iodide, nitrate, sulphate or other anions may be used. The diffusant will be chosen for the particular lens medium matrix material sought to be altered.

Selection of the silicate lens medium should be made with care to provide a compatible subassembly. Since the ideal multi-focal lens has a uniform transition from the low index major lens member to the higher index segment lens member, the refractive index of this segment should equal that of surface 34–50 of the diffused segment. It is possible to manufacture segment glasses with refractive indices, dispersion and thermal expansion characteristics compatible to the ideal segment medium. Commercially available glasses suitable for this application include barium flint, light barium crown and light flint.

While the present invention has been described by specific examples there is no intent to limit the present invention except insofar as set forth in the appended claims.

What is claimed is:

1. A method for producing a multi-focal ophthalmic lens having a major lens portion and a minor lens portion, comprising the steps of forming a parallel sided recess in a piece of glass of refractive index identical to that of the major multi-focal lens member, said recess having a cross-sectional dimension equal to that of the width of the minor multi-focal lens member, placing a diffusant in the recess, heating said piece containing said diffusant to diffuse the diffusant into said walls of said recess to produce a zone of graduated refractive index in said recess walls, the refractive index being highest at the surfaces defining the recess and decreasing outwardly therefrom, parting said diffused piece to provide a plurality of pieces of equal length each containing one diffused zone, adhering at least one piece of said diffused glass to a piece of glass having a refractive index identical to the refractive index of the minor member of the multi-focal ophthalmic lens along the surface exposed to the diffusant, preparing the minor ophthalmic lens portion from said adhered pieces, adhering said minor lens portion to a suitably prepared major lens portion and, thereafter finishing said multi-focal lens by grinding and polishing, whereby a multi-focal lens is prepared with a zone of graduated refractive index between the portions of the lens with different refractive indices.

2. The method of claim 1 wherein the diffusant is selected from the group comprising silver ions and thallium ions.

3. The method of claim 1 wherein the adhering steps are carried out by fusion.

4. A method for producing a multi-focal ophthalmic lens having a mojor lens portion and a minor lens portion with an essentially straight dividing line comprising the steps of forming a cylindrically shaped recess in a glass disk, said recess having a base diameter approximating the width of the minor lens portion, parting the disk along one diameter of the recess, adhering one-half of the disk to a straight edge of a piece of glass identical in refractive index to the major lens member, filling said recess of the adhered disk half with a diffusant and heating to diffuse material from the diffusant into said piece of glass of refractive index identical to refractive index to the major lens member to produce a zone of graduated refractive index in said piece of glass adjacent to the straight edge thereof, the index being greatest at the straight edge, parting said adhered disk from the piece of glass having the graduated zone, adhering said diffused piece of glass to a piece of glass of refractive index identical to the minor portion of the ophthalmic lens to produce a lens segment, preparing the minor ophthalmic lens portion from said segment, adhering the minor lens portion so prepared to a major lens portion, and, thereafter finishing said multi-focal lens by grinding and polishing, whereby a multi-focal lens is prepared with a zone of graduated refractive index between the portions of the lens with different refractive indices.

References Cited
UNITED STATES PATENTS

| | | | |
|---|---|---|---|
| 1,221,967 | 4/1917 | Bugbee | 65—38 XR |
| 1,588,783 | 6/1926 | Tillyer | 65—37 XR |
| 1,996,442 | 4/1935 | Stanley | 65—37 |
| Re. 20,059 | 8/1936 | Clement | 65—38 XR |
| 2,649,387 | 8/1953 | Parson et al. | 65—30 XR |
| 2,701,215 | 2/1955 | Kroeck | 65—30 |
| 2,963,823 | 12/1960 | Ohliger | 65—38 |
| 3,320,114 | 5/1967 | Schulz | 65—30 XR |

FRANK W. MIGA, Primary Examiner

U.S. Cl. X.R.

65—36, 37, 38, 39; 350—175